(12) United States Patent
Li et al.

(10) Patent No.: US 8,704,474 B2
(45) Date of Patent: Apr. 22, 2014

(54) MOTOR CONTROL METHOD AND SYSTEM AND DIGITAL SIGNAL PROCESSOR THEREOF

(75) Inventors: Cheng-Chung Li, Taoyuan Hsien (TW);
Yungtaek Jang, Taoyuan Hsien (TW);
Chang-Hsien Tu, Taoyuan Hsien (TW);
Yen-Heng Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 303 days.

(21) Appl. No.: 13/178,502

(22) Filed: Jul. 8, 2011

(65) Prior Publication Data

US 2012/0200246 A1    Aug. 9, 2012

(30) Foreign Application Priority Data

Feb. 9, 2011    (TW) .............................. 100104215 A (51) Int. Cl.
*H02P 6/08*    (2006.01)
*H02P 6/18*    (2006.01)

(52) U.S. Cl.
USPC ............. 318/400.34; 318/400.07; 318/400.35

(58) Field of Classification Search
USPC ................. 318/700, 400.07, 400.14, 400.32, 318/400.34, 400.35, 400.36
See application file for complete search history.

(56) References Cited

U.S. PATENT DOCUMENTS

| | | | | |
|---|---|---|---|---|
| 5,345,156 A * | 9/1994 | Moreira | ................... | 318/400.04 |
| 5,929,577 A * | 7/1999 | Neidorff et al. | .......... | 318/400.35 |
| 6,420,847 B1 * | 7/2002 | Galbiati et al. | ............... | 318/727 |
| 6,605,912 B1 * | 8/2003 | Bharadwaj et al. | ...... | 318/400.09 |
| 7,034,478 B2 * | 4/2006 | Bhaumik et al. | .......... | 318/400.35 |
| 8,093,847 B2 * | 1/2012 | Otaguro | ................... | 318/400.35 |
| 2006/0044664 A1 | 3/2006 | Itagaki et al. | | |

FOREIGN PATENT DOCUMENTS

| | | |
|---|---|---|
| CN | 101355334 A | 1/2009 |
| EP | 0892489 B1 | 10/2005 |
| TW | M339154 | 8/2008 |

OTHER PUBLICATIONS

Han Kong, Jinglin Liu, Guangzhao Cui, "Study on Field-weaking Theory of Brushless DC Motor Based on Phase Advance Method", Measuring Technology and Mechatronics Automation, Mar. 13-14, 2010, p. 583-586.

* cited by examiner

*Primary Examiner* — Bentsu Ro
(74) *Attorney, Agent, or Firm* — CKC & Partners Co., Ltd.

(57) ABSTRACT

A digital signal processor (DSP) is operable to receive a single-phase back electromotive force signal (back-EMF) fed back from a motor and control an inverter for driving the motor based on the single-phase back-EMF signal. The DSP includes an electrical angle building module, a rotation speed control module, and a pulse width modulation control module. In addition, the DSP further includes a field-weakening compensation module. The field-weakening compensation module is operable to automatically regulate an electrical angle based on a rotation speed of the motor and a set of predetermined compensation parameters so that the DSP can be operable to achieve an adaptive control. Furthermore, a motor control system and method are disclosed herein.

12 Claims, 5 Drawing Sheets

MOTOR CONTROL METHOD AND SYSTEM AND DIGITAL SIGNAL PROCESSOR THEREOF

RELATED APPLICATIONS

This application claims priority to Taiwan Application Serial Number 100104215, filed Feb. 9, 2011, which is herein incorporated by reference.

BACKGROUND

1. Field of Invention

The embodiment of the present invention relates generally to a processor and, more particularly, to a digital signal processor used in a motor control system.

2. Description of Related Art

A motor is the main power source in the electromechanics system and is extensively used in all sorts of the system. The advantage of the conventional carbon brush motor is that it is easy to control. The rotation speed of the motor can be changed by regulating the voltage provided to the armature. However, the armature of the carbon brush motor is located at the rotor, and a collecting ring is needed to touch the carbon brush for transducing current from the carbon brush to the collecting ring. As such, there will be spark generated between the collecting ring and the carbon brush simply due to the friction therebetween so that the carbon brush motor is not suitable for some conditions.

The permanent magnet synchronous motor (PMSM) is introduced to solve the shortcomings of the carbon brush motor. The rotor of the PMSM is a permanent magnet, and the field coil is wound around the stator. The permanent magnet rotor is rotated by the excitation of the coil on the stator sequentially. The voltage of the coil of the stator needs to be changed six times each cycle of the rotor, and the above principle is called six step commutation. Comparing with the carbon motor, the PMSM is quieter and has a higher efficiency and higher reliability, and so on.

The PMSM is controlled by a technology of 120 degrees square wave sensorless control. The technology of sensorless control is implemented by feeding back the three-phase back electromotive force signal to a digital signal processor, and the digital signal processor can control a motor based on the position detection signal corresponding to the three-phase back electromotive force signal.

However, the technology of sensorless control adopting feeding back three-phase back electromotive force signal results in unsymmetrical square wave current and increase of the torque ripple caused by unbalanced motor magnetic field distribution, and the drive efficiency is reduced by the above mentioned problems. Accordingly, there exists an urgent need in the related art to provide a solution to address these disadvantages.

SUMMARY

A digital signal processor is provided so as to improve the unsymmetrical square wave current and increase of the torque ripple caused by unbalanced motor magnetic field distribution when a three-phase back electromotive force is fed back, and the drive efficiency is reduced by the above mentioned problems.

Thus, one aspect of the embodiment of the present invention is to provide a digital signal processor. The digital signal processor receives a single-phase back electromotive force signal fed back by a motor and controls an inverter to icy drive the motor based on the single-phase back electromotive force signal. The digital signal processor comprises an electrical angle building module, a rotation speed control module, and a pulse width modulation control module.

The electrical angle building module receives the single-phase back electromotive force signal and builds a magnetic field electrical angle corresponding to the single-phase back electromotive force signal; and generates a six-step magnetizing phase changing signal by processing the magnetic field electrical angle.

In one embodiment of the present invention, the rotation speed control module comprises a speed estimator and a speed controller. The speed estimator receives the magnetic field electrical angle and estimates a motor rotation speed value of the motor based on an angle and a period of the magnetic field electrical angle. The speed controller generates the rotation speed control signal by comparing the motor rotation speed value and a rotation speed command value.

In another embodiment of the present invention, the digital signal processor further comprises a field-weakening compensation module. The field-weakening compensation module generates a field-weakening displacement angle based on the motor rotation speed value and a group of predetermined compensation parameters and provides the field-weakening displacement angle for the electrical angle building module so that the electrical angle building module regulates the magnetic field electrical angle based on the field-weakening displacement angle.

In yet another embodiment of the present invention, the field-weakening displacement angle is generated by the following formula:

$$\theta = \omega \times \alpha + \beta$$

wherein $\theta$ is the field-weakening displacement angle, $\omega$ is the motor rotation speed value, and $\alpha$ and $\beta$ are the group of the predetermined compensation parameters.

In still another embodiment of the present invention, the digital signal processor further comprises an initial control module. The initial control module outputs an initial six-step magnetizing phase changing signal to the pulse width modulation control module before the rotation speed of the motor achieves a predetermined rotation speed thereof so that the pulse width modulation control module generates the pulse width modulation control signal.

In another aspect, the embodiment of the present invention provides a motor control system. The motor control system comprises a feedback circuit, a digital signal processor, and an inverter. The feedback circuit is electrically connected to a motor for feeding back a single-phase back electromotive force signal of the motor. The digital signal processor comprises an electrical angle building module, a rotation speed control module, and a pulse width modulation control module.

The electrical angle building module receives the single-phase back electromotive force signal and builds a magnetic field electrical angle corresponding to the single-phase back electromotive force signal; and generates a six-step magnetizing phase changing signal by processing the magnetic field electrical angle. The rotation speed control module is electrically connected to the electrical angle building module for generating a rotation speed control signal based on the magnetic field electrical angle. The pulse width modulation control module receives the rotation speed control signal and the six-step magnetizing phase changing signal and generates a pulse width modulation control signal. The inverter is electrically connected to the motor and the digital signal processor for receiving the pulse width modulation control signal to drive the motor.

In one embodiment of the present invention, the rotation speed control module comprises a speed estimator and a speed controller. The speed estimator receives the magnetic field electrical angle and estimates a motor rotation speed value of the motor based on an angle and a period of the magnetic field electrical angle. The speed controller generates the rotation speed control signal by comparing the motor rotation speed value and a rotation speed command value.

In another embodiment of the present invention, the digital signal processor further comprises a field-weakening compensation module. The field-weakening compensation module generates a field-weakening displacement angle based on the motor rotation speed value and a group of predetermined compensation parameters and provides the field-weakening displacement angle for the electrical angle building module so that the electrical angle building module regulates the magnetic field electrical angle based on the field-weakening displacement angle.

In yet another embodiment of the present invention, the field-weakening displacement angle is generated by the following formula:

$$\theta=\omega\times\alpha+\beta$$

wherein $\theta$ is the field-weakening displacement angle, $\omega$ is the motor rotation speed value, and $\alpha$ and $\beta$ are the group of the predetermined compensation parameters.

In still another embodiment of the present invention, the feedback circuit comprises three feedback resistors and a comparing unit. Each of the feedback resistors comprises a first terminal and a second terminal, the first terminals of the feedback resistors are electrically connected to three-phase winding of the motor respectively, and the second terminals of the feedback resistors are electrically connected to a neutral point. The comparing unit is electrically connected to one of the first terminals of the feedback resistors and the neutral point for receiving the single-phase back electromotive force signal and a neutral point electrical potential signal and comparing the single-phase back electromotive force signal and the neutral point electrical potential signal to generate a detection signal, wherein the electrical angle building module receives the detection signal and builds a magnetic field electrical angle corresponding to the detection signal; and generates a six-step magnetizing phase changing signal by processing the magnetic field electrical angle.

In yet another embodiment of the present invention, the digital signal processor further comprises an initial control module. The initial control module outputs an initial six-step magnetizing phase changing signal to the pulse width modulation control module before the rotation speed of the motor achieves a predetermined rotation speed thereof so that the pulse width modulation control module generates the pulse width modulation control signal.

In yet another aspect, the embodiment of the present invention provides a method for controlling a motor. The method for controlling the motor comprises the steps of feeding back a single-phase back electromotive force signal; building a magnetic field electrical angle corresponding to the single-phase back electromotive force signal; generating a six-step magnetizing phase changing signal by processing the magnetic field electrical angle; generating a rotation speed control signal based on the magnetic field electrical angle; and generating a pulse width modulation control signal based on the rotation speed control signal and the six-step magnetizing phase changing signal to drive a motor.

In one embodiment of the present invention, the step of generating the rotation speed control signal based on the magnetic field electrical angle comprises the steps of estimating a motor rotation speed value of the motor based on an angle and a period of the magnetic field electrical angle; and generating the rotation speed control signal based on the motor rotation speed icy value and a rotation speed command value.

In another embodiment of the present invention, the method for controlling the motor further comprises the steps of generating a field-weakening displacement angle based on the motor rotation speed value and a group of predetermined compensation parameters; and regulating the magnetic field electrical angle based on the field-weakening displacement angle.

In yet another embodiment of the present invention, the field-weakening displacement angle is generated by the following formula:

$$\theta=\omega\times\alpha+\beta$$

wherein $\theta$ is the field-weakening displacement angle, $\omega$ is the motor rotation speed value, and $\alpha$ and $\beta$ are the group of the predetermined compensation parameters.

In summary, the embodiments of the present invention provide the digital signal processor. The digital signal processor receives the single-phase back electromotive force signal fed back by the motor so as to improve the problem caused by the unbalanced motor magnetic field distribution when a three-phase back electromotive force is fed back so that the drive efficiency is increased. Moreover, there are two feedback wiring lines being saved so as to decrease production costs.

On the other hand, the digital signal processor of the embodiment of the present invention further comprises the field-weakening compensation module. The field-weakening compensation module regulates the magnetic field electrical angle automatically based on the motor rotation speed value and the group of predetermined compensation parameters so that the motor can be controlled adaptively. As such, the flexibility of the square wave sensorless technique can be increased substantially so as to optimize the efficiency of the motor in different rotation speeds and loads of the motor.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

Figure 1:
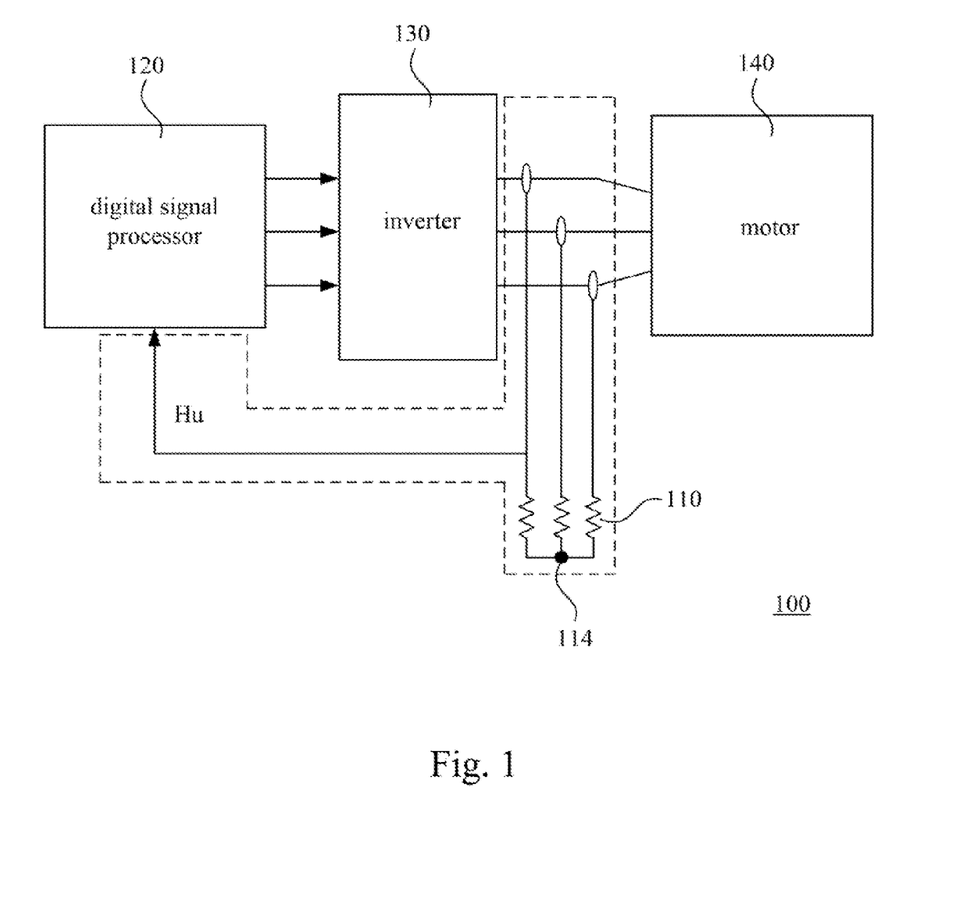
FIG. 1 schematically shows a diagram of a motor control system according to one embodiment of the present invention.

FIG. 1 schematically shows a diagram of a motor control system (comprising motor 140) 100 according to one embodiment of the present invention. The motor control system 100 comprises a feedback circuit 110, a neutral point 114, a digital signal processor 120, and an inverter 130. In this embodiment, the motor 140 is also shown to present the coupled relationship between the motor control system 100 and the motor 140 so that the operation relationship between the motor control system 100 and the motor 140 will be easy to illustrate.

As shown in FIG. 1, the feedback circuit 110 is electrically connected to the motor 140 for feeding back a single-phase back electromotive force signal of the motor. The digital signal processor 120 receives the single-phase back electromotive force signal to control the inverter 130 and drives the motor 140 based on the single-phase back electromotive force signal. In this embodiment of the present invention, the single-phase back electromotive force signal of the motor 140 is fed back, and the single-phase back electromotive force signal of the motor 140 is processed by the digital signal processor 120. Then, a pulse width modulation control signal and a six-step magnetizing phase changing signal are generated so as to control the inverter 130 and drive the motor 140.

In the motor control system 100, the digital signal processor 120 is used to process the single-phase back electromotive force signal; therefore, the digital signal processor 120 is further introduced as follows, and the steps for processing the single-phase back electromotive force signal in the digital signal processor 120 will be described in detail.

It is noteworthy that the motor in the embodiment of the present invention may be a permanent magnet synchronous motor so that the embodiment of the present invention can receive the signal fed back by the permanent magnet synchronous motor directly or indirectly and process the fed back signal to control the permanent magnet synchronous motor. However, the scope of the present application is not intended to be limited to the embodiment, it should be understood by those skilled in the art that the embodiment of the present invention may be used to control different sorts of motors.

Figure 2:
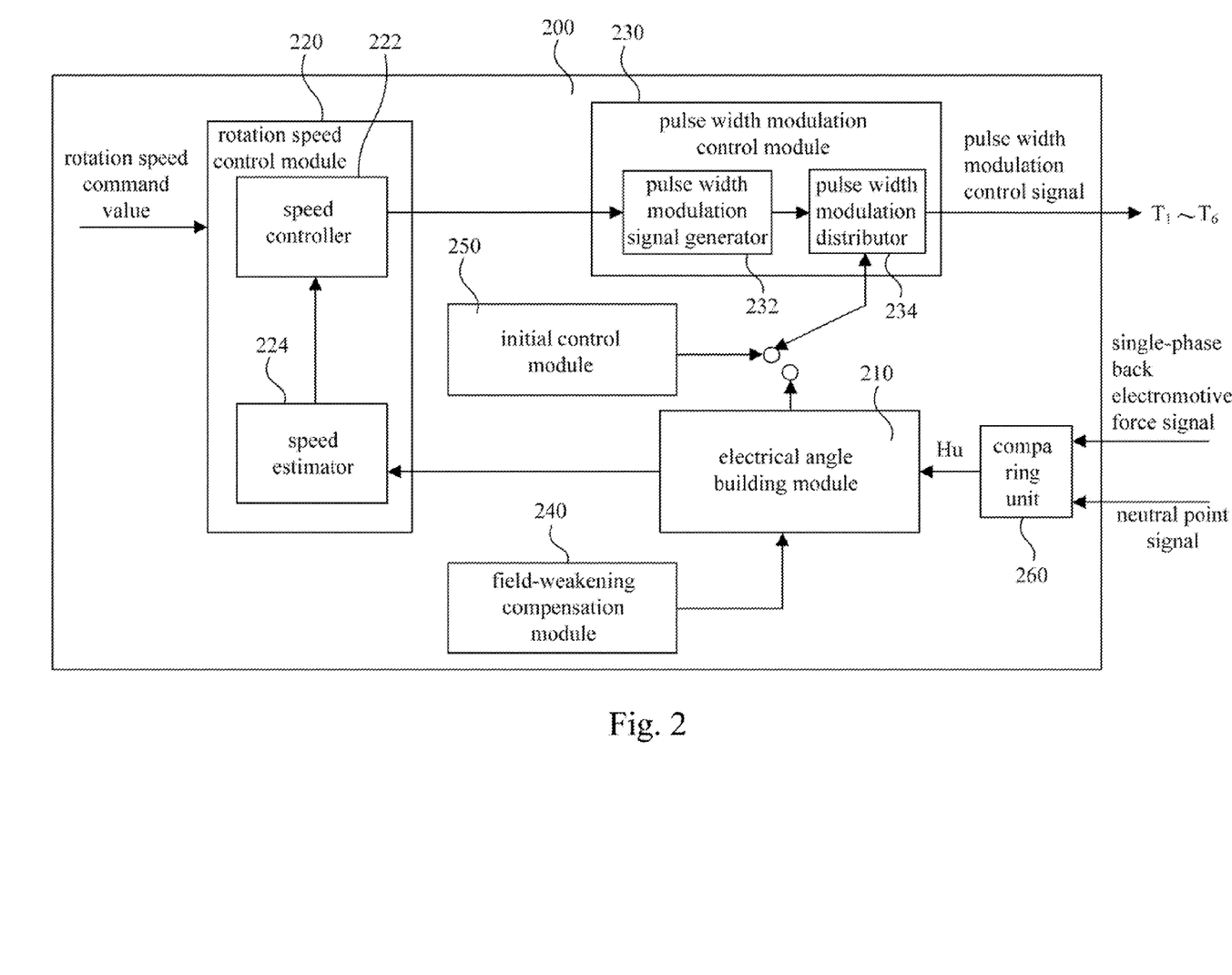
FIG. 2 schematically shows a circuit block diagram of the digital signal processor according to one embodiment of the present invention.

Reference is now made to FIG. 2 which schematically shows a circuit block diagram of the digital signal processor 200 according to one embodiment of the present invention. The digital signal processor 200 comprises an electrical angle building module 210, a rotation speed control module 220, and a pulse width modulation control module 230.

Specifically, the electrical angle building module 210 receives the single-phase back electromotive force signal and builds a magnetic field electrical angle corresponding to the single-phase back electromotive force signal; and generates a six-step magnetizing phase changing signal by processing the magnetic field electrical angle. The rotation speed control module 220 is electrically connected to the electrical angle building module 210 for generating a rotation speed control signal based on the magnetic field electrical angle. The pulse width modulation control module 230 receives the rotation speed control signal and the six-step magnetizing phase changing signal and generates a pulse width modulation control signal to control the inverter 130 so that the inverter 130 drives the motor 140.

Figure 3:
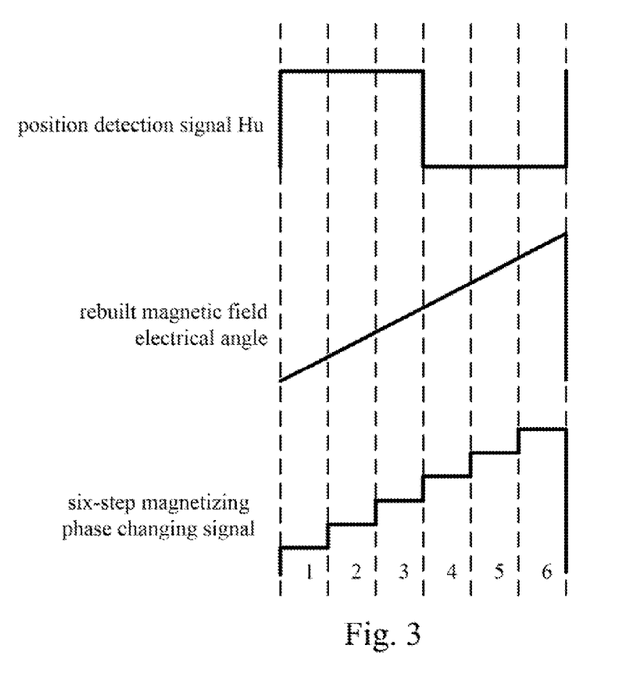
FIG. 3 schematically shows a contrast diagram of a position detection signal, a magnetic field electrical angle, and a six-step magnetizing phase changing signal according to another embodiment of the present invention.

Specifically, the digital signal processor 200 may comprise comparing unit 260. The comparing unit 260 is used to receive a single-phase back electromotive force signal and a neutral point signal as shown in FIG. 1; then the comparing unit 260 is used to compare the mentioned signals to obtain the detection signal Hu. The position detection signal Hu as shown in FIG. 3 is a square wave. FIG. 3 schematically shows a contrast diagram of the position detection signal, the magnetic field electrical angle, and the six-step magnetizing phase changing signal according to another embodiment of the present invention.

Figure 4:
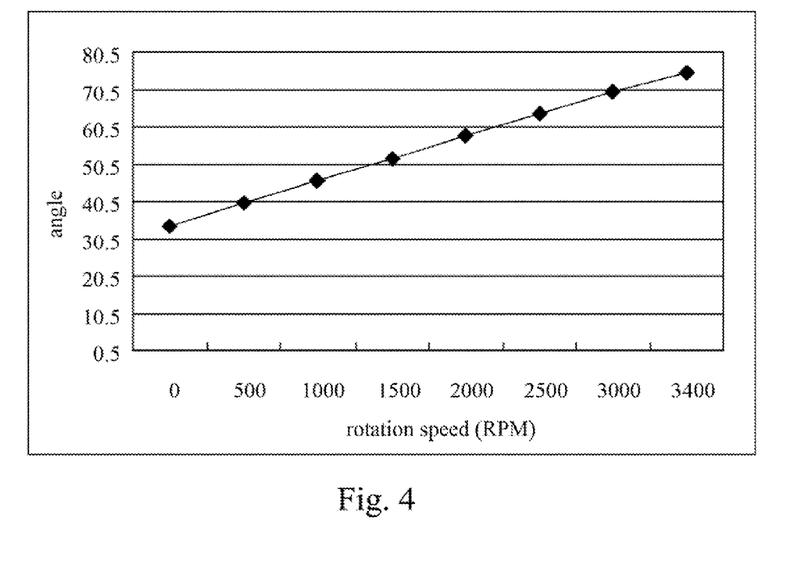
FIG. 4 schematically shows a diagram of a rotation speed and an angle of a motor according to yet another embodiment of the present invention.

As shown in FIG. 4, the electrical angle building module 210 receives the position detection signal Hu. The magnetic field electrical angle herein is built by the electrical angle building module 210 based on one period of the position detection signal Hu. For instance, the zero degree of the magnetic field electrical angle is built from the beginning of the period of the position detection signal Hu to the end of the same period of the position detection signal Hu thereby forms the whole 360 degree of the magnetic field electrical angle. Furthermore, the electrical angle building module 210 may divide the magnetic field electrical angle equally to obtain the six-step magnetizing phase changing signal as shown in FIG. 3.

As shown in FIG. 2, the rotation speed control module 220 may comprise a speed controller 222 and a speed estimator 224. The speed estimator 224 is used to receive the magnetic field electrical angle and estimate a motor rotation speed value of the motor based on an angle and a period of the magnetic field electrical angle. The speed controller 222 is used to compare the motor rotation speed value and a rotation speed command value to generate the rotation speed control signal.

Moreover, the pulse width modulation control module 230 may comprise pulse width modulation signal generator 232 and pulse width modulation distributor 234. The pulse width modulation signal generator 232 is used to receive the rotation speed control signal, and the rotation speed control signal is compared with a carrier wave for generating the pulse width modulation signal. The pulse width modulation distributor 234 receives the pulse width modulation signal and the six-step magnetizing phase changing signal to generate the pulse width modulation control signal to control the inverter 130 as shown in FIG. 1 so that the inverter 130 drives the motor 140.

Figure 5:
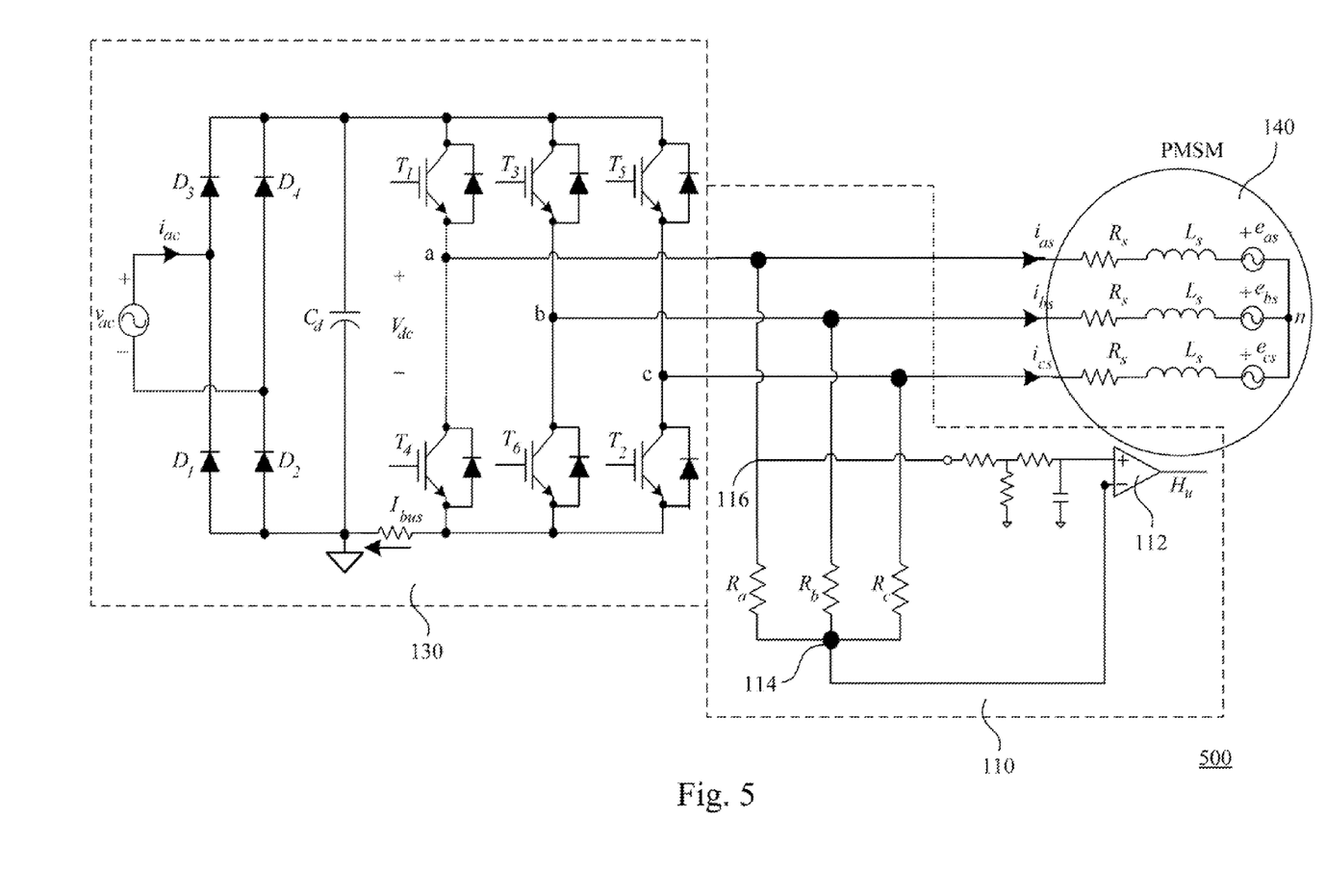
FIG. 5 schematically shows a diagram of a motor control detection circuit according to still another embodiment of the present invention.

The so-called six-step magnetizing phase changing signal is mainly used to let the pulse width modulation distributor 234 know when to switch the power switch in the inverter 130 (for example, switch T1~T6 as shown in FIG. 5). For example, the pulse width modulation control module 230 needs to control the power switch in the inverter 130 every time the rotor of the motor 140 rotates 60 degrees angle so that the rotor of the motor 140 can keep rotating, and the switch conditions of the power switch in the inverter 130 is determined by the six-step magnetizing phase changing signal.

As shown in FIG. 2, the digital signal processor 200 further comprises a field-weakening compensation module 240. The field-weakening compensation module 240 generates a field-weakening displacement angle based on the motor rotation speed value and a group of predetermined compensation parameters, and provides the field-weakening displacement angle for the electrical angle building module 210 so that the electrical angle building module 210 regulates the magnetic field electrical angle based on the field-weakening displacement angle. As a result, with the use of the field-weakening compensation module 240, the digital signal processor 200 may regulate the magnetic field electrical angle automatically so that the motor 140 as shown in FIG. 1 can be controlled adaptively. As such, the flexibility of the square wave sensorless technique can be increased substantially so as to optimize the efficiency of the motor in different rotation speeds and loads of the motor.

Specifically, the field-weakening displacement angle is generated by the following formula:

$$\theta = \omega \times \alpha + \beta$$

wherein $\theta$ is the field-weakening displacement angle, $\omega$ is the motor rotation speed value, and $\alpha$ and $\beta$ are the group of the predetermined compensation parameters. The $\alpha$ and $\beta$ will be illustrated in FIG. 4 as follows.

FIG. 4 schematically shows a diagram of a rotation speed and an angle of a motor according to yet another embodiment of the present invention. It is noteworthy that the mentioned group of the compensation parameters $\alpha$ and are generated by performing a standardization process on motors; that is to say, the group of the compensation parameters must be generated by performing a standardization process on the motors before using the embodiment of the present invention to control each of the motors.

First, the motor is driven so that the motor steadily speeds up to 500 RPM (revolutions per minute), 1000 RPM, 1500 RPM, 2000 RPM, 2500 RPM, 3000 RPM, 3400 RPM, and so on. With the use of the external hall sensor, the best efficiency compensation angle can be measured in different rotation speeds. Next, find the slope of the straight line as shown in FIG. 4, and the slope is $\alpha$. Moreover, extend the straight line as shown in FIG. 4 towards the left across the Y axis at a point, the angle value corresponding to the point is $\beta$.

Reference is now made to FIG. 2, the digital signal processor 200 of the present invention further comprises an initial control module 250. The initial control module 250 outputs an initial six-step magnetizing phase changing signal to the pulse width modulation control module 230 before the rotation speed of the motor 140 achieves a predetermined rotation speed thereof so that the pulse width modulation control module 230 generates the pulse width modulation control signal.

The feedback is not steady before the motor 140 achieves a predetermined rotation speed (for example: 400 RPM). In this condition, the initial control module 250 outputs the six-step magnetizing phase changing signal to the pulse width modulation control module 230 first. After the motor 140 achieves the predetermined rotation speed, the module providing the six-step magnetizing phase changing signal changes from the initial control module 250 to the electrical angle building module 230.

On the other hand, the relation of the feedback circuit 110, the inverter 130, and the motor 140 of the motor control system 100 as shown in FIG. 1 will be illustrated in FIG. 5.

FIG. 5 schematically shows a diagram of a motor control detection circuit 500 according to still another embodiment of the present invention. The motor control detection circuit 500 comprises the feedback circuit 110 and the inverter 130. The motor 140 is also shown in FIG. 5 herein, the operation of the motor 140 is shown in the description of FIG. 1.

the feedback circuit 110 comprises three feedback resistors, for example, Ra, Rb and Rc, and comparing unit 112. Each of the feedback resistors comprises a first terminal and a second terminal. The first terminals of the feedback resistors are electrically connected to three-phase winding of the motor 140 respectively, and the second terminals of the feedback resistors are electrically connected to a neutral point 114. The comparing unit 112 is electrically connected to one of the first terminals 116 of the feedback resistors and the neutral point 114 for receiving the single-phase back electromotive force signal and a neutral point electrical potential signal and comparing the single-phase back electromotive force signal and the neutral point electrical potential signal to generate a detection signal.

In this embodiment, the electrical angle building module 210 is used to receive the position detection signal Hu and build a magnetic field electrical angle corresponding to the position detection signal Hu; and generate a six-step magnetizing phase changing signal by processing the magnetic field electrical angle.

In addition, inverter 130 comprises rectifier (for example: diodes D1~D4), filter (for example: capacitor Cd), and six power switches T1 to T6. The switches are used to receive the pulse width modulation control signal for switching the switches so that the different voltages between three-phase winding of the motor 140. The power switch may be a bipolar junction transistor (BJT), a metal oxide semiconductor field effect transistor (MOFET), or an insulation gate bipolar transistor (IGBT). However, the scope of the present application is not intended to be limited to the embodiment, it should be understood by those skilled in the art that any electrical element having the same function may be used as a power switch without departing from the spirit and scope of the invention as defined by the appended claim can remain within the scope of the present invention. The numbers of the power switch is not intended to be limited to six, only if the numbers of the power switch adopted in the embodiment can achieve the aim of the invention, which is within the scope of the present invention.

Figure 6:
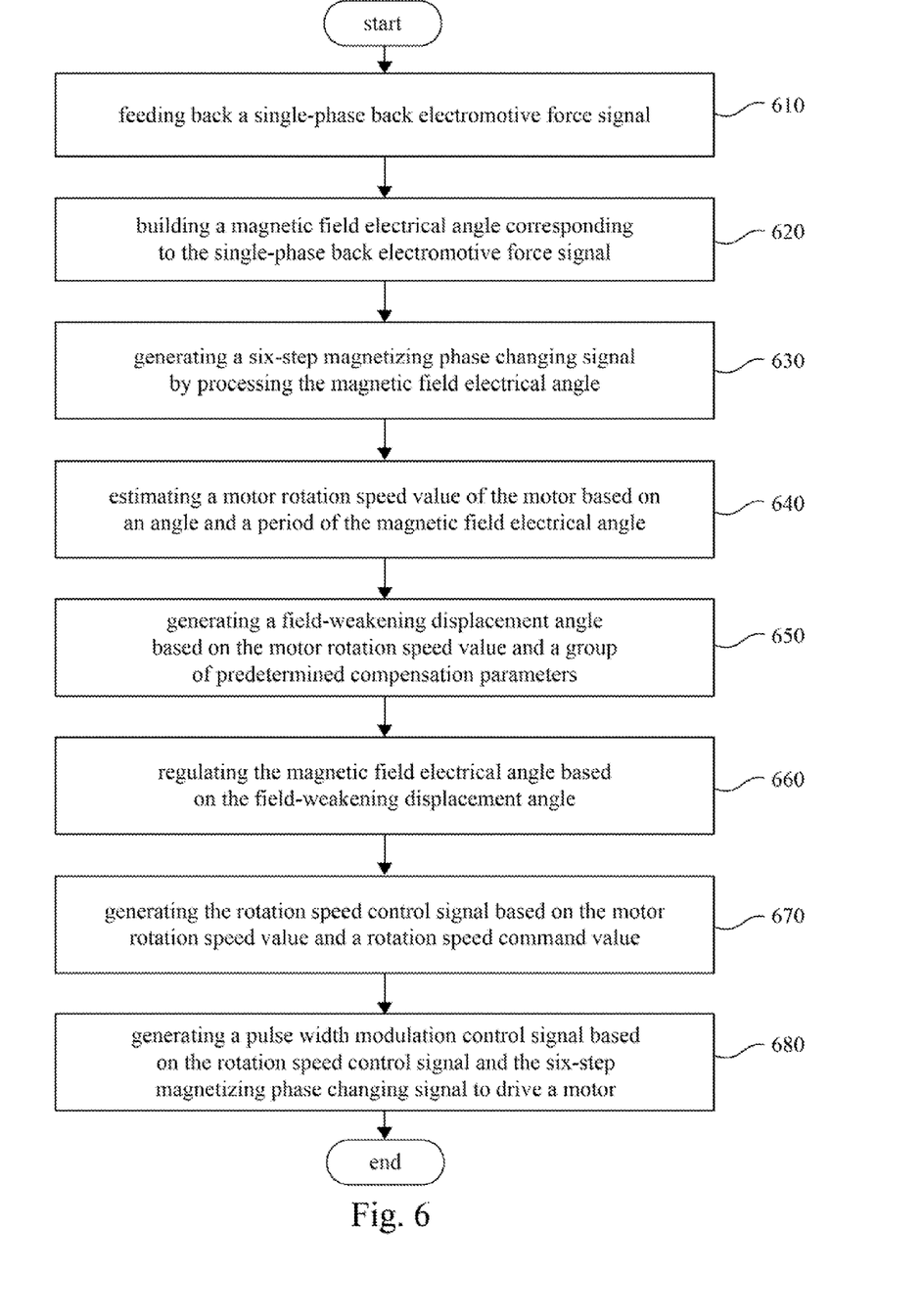
FIG. 6 schematically shows a flow chart illustrating a method for controlling the motor according to one embodiment of the present invention.

According to another embodiment of the present invention, a method for controlling the motor is provided. As shown in FIG. 6, a method for controlling the motor comprises the steps of feeding back a single-phase back electromotive force signal (step 610); building a magnetic field electrical angle corresponding to the single-phase back electromotive force signal (step 620); generating a six-step magnetizing phase changing signal by processing the magnetic field electrical angle (step 630).

The step 610 can be illustrated in accordance with FIG. 1. In operation, the single-phase back electromotive force signal can be fed back by the feedback circuit 110.

As shown in FIG. 2, the step 620 can be implemented by the electrical angle building module 210. In this embodiment, the digital signal processor 200 can further comprise a comparing unit 260. The comparing unit 260 is used to obtain the position detection signal Hu by comparing the single-phase back electromotive force signal and the neutral point signal. The electrical angle building module 210 builds the magnetic field electrical angle based on one period of the position detection signal Hu.

In step 630, the electrical angle building module 210 generates the six-step magnetizing phase changing signal by processing the magnetic field electrical angle. As could be appreciated, the principles of the operation of the electrical angle building module 210 have been described hereinabove in connection with FIG. 2, and accordingly, a detailed description regarding the operation of the electrical angle building module 210 is omitted herein for the sake of brevity.

Next, the method for controlling the motor comprises the steps of estimating a motor rotation speed value of the motor based on an angle and a period of the magnetic field electrical angle (step 640); generating a field-weakening displacement angle based on the motor rotation speed value and a group of predetermined compensation parameters (step 650); regulating the magnetic field electrical angle based on the field-weakening displacement angle (step 660).

In step 640, the motor rotation speed value of the motor may be estimated by the speed estimator 224 as shown in FIG. 2 based on the angle and a period of the magnetic field electrical angle.

Then, in step 650, the field-weakening displacement angle may be generated by the field-weakening compensation module 240 based on the motor rotation speed value and the group of predetermined compensation parameters. The field-weakening displacement angle in this embodiment can be generated by the following formula:

$$\theta = \omega \times \alpha + \beta$$

wherein $\theta$ is the field-weakening displacement angle, $\omega$ is the motor rotation speed value, and $\alpha$ and $\beta$ are the group of the predetermined compensation parameters. The predetermined compensation parameters $\alpha$ and $\beta$ refer to the description in FIG. 4.

The magnetic field electrical angle is regulated based on the field-weakening displacement angle $\theta$ in step 660. The field-weakening displacement angle $\theta$ can be received by the electrical angle building module 210 as mentioned in FIG. 2 to regulate the magnetic field electrical angle. As such, the field-weakening displacement angle $\theta$ can be provided to the electrical angle building module 210, so that the motor 140 can be controlled adaptively. In view of the foregoing, the flexibility of the square wave sensorless technique can be increased substantially so as to optimize the efficiency of the motor in different rotation speeds and loads of the motor.

As shown in FIG. 6, the method for controlling the motor comprises the steps of generating the rotation speed control signal based on the motor rotation speed value and a rotation speed command value (step 670); generating a pulse width modulation control signal based on the rotation speed control signal and the six-step magnetizing phase changing signal to drive a motor (step 680).

As shown in step 670, the rotation speed control signal can be generated by comparing the motor rotation speed value and the rotation speed command value with the speed controller 222 as shown in FIG. 2.

Furthermore, in step 680, the rotation speed control signal and the six-step magnetizing phase changing signal can be received by the pulse width modulation control module 230. The pulse width modulation control signal is generated by processing the above signals with the pulse width modulation control module 230. The pulse width modulation control signal as mentioned in FIG. 1 can be used to control the inverter 130 so that the inverter 130 drives the motor 140.

In view of the foregoing embodiments of the present invention, many advantages of the present invention are now apparent. The embodiment of the present invention provides a digital signal processor. The digital signal processor receives the single-phase back electromotive force signal fed back by the motor so as to improve the problem caused by the unbalanced motor magnetic field distribution when a three-phase back electromotive force is fed back so that the drive efficiency is increased. Moreover, there are two feedback wiring lines being saved so as to decrease production costs.

On the other hand, the digital signal processor of the embodiment of the present invention further comprises the field-weakening compensation module. The field-weakening compensation module regulates the magnetic field electrical angle automatically based on the motor rotation speed value and the group of predetermined compensation parameters so that the motor can be controlled adaptively in accordance with the digital signal processor. As such, the flexibility of the square wave sensorless technique can be increased substantially so as to optimize the efficiency of the motor in different rotation speeds and loads of the motor.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A digital signal processor for receiving a single-phase back electromotive force signal fed back by a motor and controlling an inverter to drive the motor based on the single-phase back electromotive force signal, the digital signal processor comprising:

an electrical angle building module for receiving the single-phase back electromotive force signal and building a magnetic field electrical angle corresponding to the single-phase back electromotive force signal; and generating a six-step magnetizing phase changing signal by processing the magnetic field electrical angle;

a rotation speed control module electrically connected to the electrical angle building module for generating a rotation speed control signal based on the magnetic field electrical angle;

a pulse width modulation control module for receiving the rotation speed control signal and the six-step magnetizing phase changing signal and generating a pulse width modulation control signal to control the inverter so that the inverter drives the motor; and a field-weakening compensation module for generating a field-weakening displacement angle based on a motor rotation speed value of the motor and a group of predetermined compensation parameters and providing the field-weakening displacement angle for the electrical angle building module so that the electrical angle building module regulates the magnetic field electrical angle based on the field-weakening displacement angle.

2. The digital signal processor according to claim 1, wherein the rotation speed control module comprises:

a speed estimator for receiving the magnetic field electrical angle and estimating the motor rotation speed value of the motor based on an angle and a period of the magnetic field electrical angle; and a speed controller for generating the rotation speed control signal by comparing the motor rotation speed value and a rotation speed command value.

3. The digital signal processor according to claim 2, wherein the field-weakening displacement angle is generated by the following formula:

$$\theta=\omega\times\alpha+\beta$$

wherein $\theta$ is the field-weakening displacement angle, $\omega$ is the motor rotation speed value, and $\alpha$ and $\beta$ are the group of the predetermined compensation parameters.

4. The digital signal processor according to claim 1, further comprising:

an initial control module for outputting an initial six-step magnetizing phase changing signal to the pulse width modulation control module before the rotation speed of the motor achieves a predetermined rotation speed thereof so that the pulse width modulation control module generates the pulse width modulation control signal.

5. A motor control system, comprising:

a feedback circuit electrically connected to a motor for feeding back a single-phase back electromotive force signal of the motor;

a digital signal processor, comprising:

an electrical angle building module for receiving the single-phase back electromotive force signal and building a magnetic field electrical angle corresponding to the single-phase back electromotive force signal; and generating a six-step magnetizing phase changing signal by processing the magnetic field electrical angle;

a rotation speed control module electrically connected to the electrical angle building module for generating a rotation speed control signal based on the magnetic field electrical angle; and a pulse width modulation control module for receiving the rotation speed control signal and the six-step magnetizing phase changing signal and generating a pulse width modulation control signal;

an inverter electrically connected to the motor and the digital signal processor for receiving the pulse width modulation control signal to drive the motor; and a field-weakening compensation module for generating a field-weakening displacement angle based on a motor rotation speed value of the motor and a group of predetermined compensation parameters and providing the field-weakening displacement angle for the electrical angle building module so that the electrical angle building module regulates the magnetic field electrical angle based on the field-weakening displacement angle.

6. The motor control system according to claim 5, wherein the rotation speed control module comprises:

a speed estimator for receiving the magnetic field electrical angle and estimating the motor rotation speed value of the motor based on an angle and a period of the magnetic field electrical angle; and a speed controller for generating the rotation speed control signal by comparing the motor rotation speed value and a rotation speed command value.

7. The motor control system according to claim 6, wherein the field-weakening displacement angle is generated by the following formula:

$$\theta=\omega\times\alpha+\beta,$$

wherein $\theta$ is the field weakening displacement angle, $\omega$ is the motor rotation speed value, $\alpha$ and $\beta$ are the group of the predetermined compensation parameters.

8. The motor control system according to claim 5, wherein the feedback circuit comprises:

three feedback resistors, wherein each of the feedback resistors comprises a first terminal and a second terminal, the first terminals of the feedback resistors are electrically connected to three-phase winding of the motor respectively, and the second terminals of the feedback resistors are electrically connected to a neutral point; and a comparing unit electrically connected to one of the first terminals of the feedback resistors and the neutral point for receiving the single-phase back electromotive force signal and a neutral point electrical potential signal and comparing the single-phase back electromotive force signal and the neutral point electrical potential signal to generate a detection signal, wherein the electrical angle building module receives the detection signal and builds a magnetic field electrical angle corresponding to the detection signal; and generates a six-step magnetizing phase changing signal by processing the magnetic field electrical angle.

9. The motor control system according to claim 5, wherein the digital signal processor further comprises:

an initial control module for outputting an initial six-step magnetizing phase changing signal to the pulse width modulation control module before the rotation speed of the motor achieves a predetermined rotation speed thereof so that the pulse width modulation control module generates the pulse width modulation control signal.

10. A method for controlling a motor, comprising the steps of:

feeding back a single-phase back electromotive force signal;

building a magnetic field electrical angle corresponding to the single-phase back electromotive force signal;

generating a six-step magnetizing phase changing signal by processing the magnetic field electrical angle;

generating a rotation speed control signal based on the magnetic field electrical angle; and generating a pulse width modulation control signal based on the rotation speed control signal and the six-step magnetizing phase changing signal to drive a motor; and generating a field-weakening displacement angle based on a motor rotation speed value of the motor and a group of predetermined compensation parameters; and regulating the magnetic field electrical angle based on the field-weakening displacement angle.

11. The method according to claim 10, wherein the step of generating the rotation speed control signal based on the magnetic field electrical angle comprises the steps of:

estimating the motor rotation speed value of the motor based on an angle and a period of the magnetic field electrical angle; and generating the rotation speed control signal based on the motor rotation speed value and a rotation speed command value.

12. The method according to claim 11, wherein the field-weakening displacement angle is generated by the following formula:

$$\theta = \omega \times \alpha + \beta,$$

wherein $\theta$ is the field-weakening displacement angle, $\omega$ is the motor rotation speed value, and $\alpha$ and $\beta$ are the group of the predetermined compensation parameters.

* * * * *